(12) United States Patent
McMillin et al.

(10) Patent No.: US 6,478,308 B1
(45) Date of Patent: Nov. 12, 2002

(54) REPLACEABLE DOOR SEAL AND RETAINER ASSEMBLIES

(75) Inventors: Kenneth L. McMillin, Delaware; Alfred T. Dietrich, Marion, both of OH (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 09/480,449

(22) Filed: Jan. 10, 2000

(51) Int. Cl.[7] .............................. F16J 15/02; E06B 7/16
(52) U.S. Cl. ..................... 277/630; 277/637; 277/642; 277/650; 277/921; 49/490.1; 49/495.1
(58) Field of Search ................................ 277/630, 637, 277/641, 642, 644, 648, 650, 906, 921, 922, 924; 49/482.1, 490.1, 495.1

(56) References Cited

U.S. PATENT DOCUMENTS

| | | |
|---|---|---|
| 3,886,686 A | 6/1975 | Urbanick |
| 4,001,974 A | 1/1977 | Wright |
| 4,015,368 A | 4/1977 | Court et al. |
| 4,119,325 A | 10/1978 | Oakley et al. |
| 4,527,807 A | 7/1985 | Urbanick |
| 4,538,380 A * | 9/1985 | Colliander |
| 4,957,301 A * | 9/1990 | Clay, Jr. et al. |
| 4,970,102 A * | 11/1990 | Guillon |
| 5,007,203 A * | 4/1991 | Katrynuik |
| 5,107,622 A | 4/1992 | Fuchs et al. |
| 5,435,104 A | 7/1995 | Dietrich |
| 5,499,475 A | 3/1996 | Court et al. |
| 5,566,954 A * | 10/1996 | Hahn |
| 5,749,175 A | 5/1998 | Koike et al. |
| 5,816,309 A | 10/1998 | Paradise |
| 6,058,657 A * | 5/2000 | Merla |

FOREIGN PATENT DOCUMENTS

DE 19720940 11/1998

* cited by examiner

Primary Examiner—Anthony Knight
Assistant Examiner—John L. Beres
(74) Attorney, Agent, or Firm—Gardere Wynne Sewell LLP

(57) ABSTRACT

Door edge seal and retainer assemblies, particularly adapted for swing doors of motor truck and similar cargo containers, include elongated channel shaped retainer parts adapted to be mounted on the panel edges of the cargo container doors and comprising generally channel shaped members adapted to be secured to the panel edges. One or more elongated seal lip parts are integrally joined to the retainer part and may be cut away to provide access to one or more slots formed on the retainer part to receive flanges of replacement seal lip members for mounting the replacement seal lip members on the retainer parts without removing them from the panel edge in the event of damage to the original seal lip parts. The integral seal lip parts and retainer parts are preferably coextruded of polyvinylchloride wherein the lip parts are more flexible and of a lower hardness than the retainer part.

11 Claims, 3 Drawing Sheets

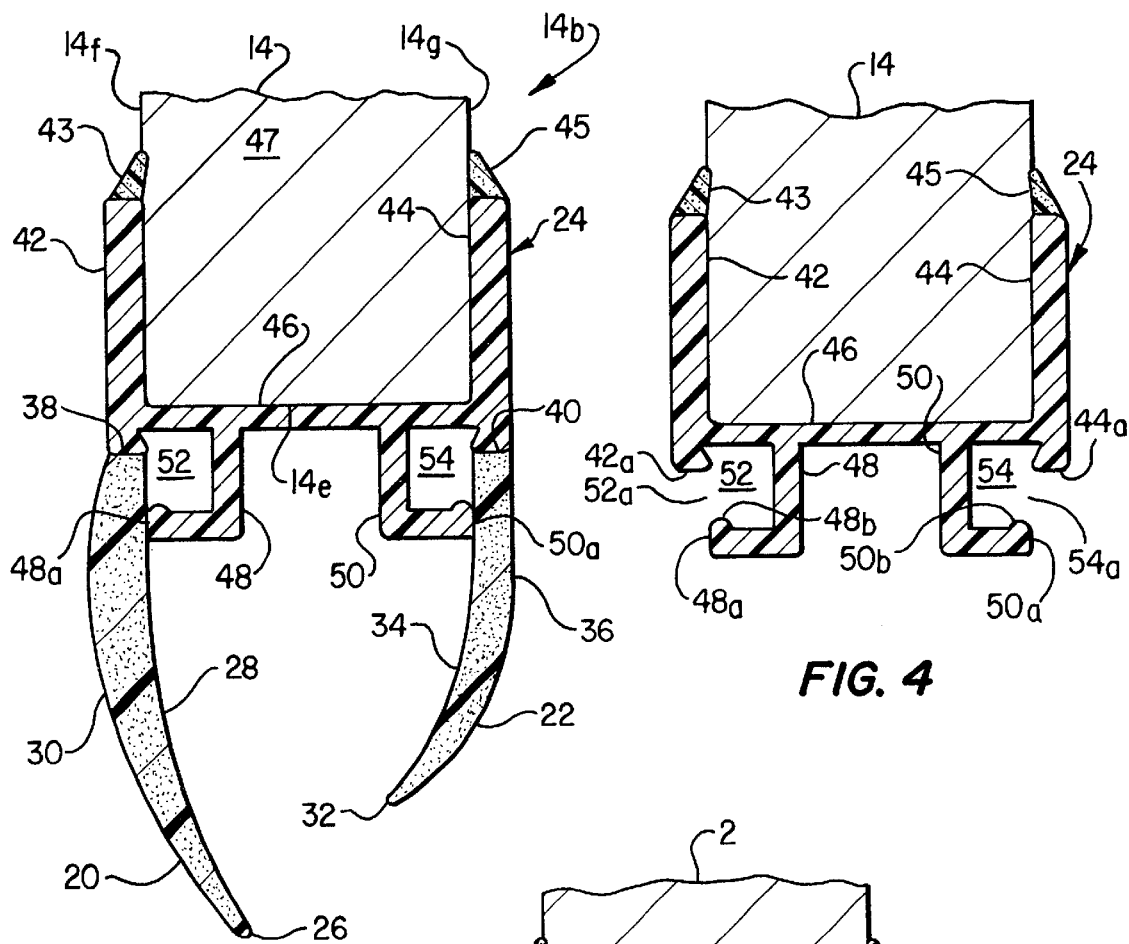
FIG. 3
FIG. 4
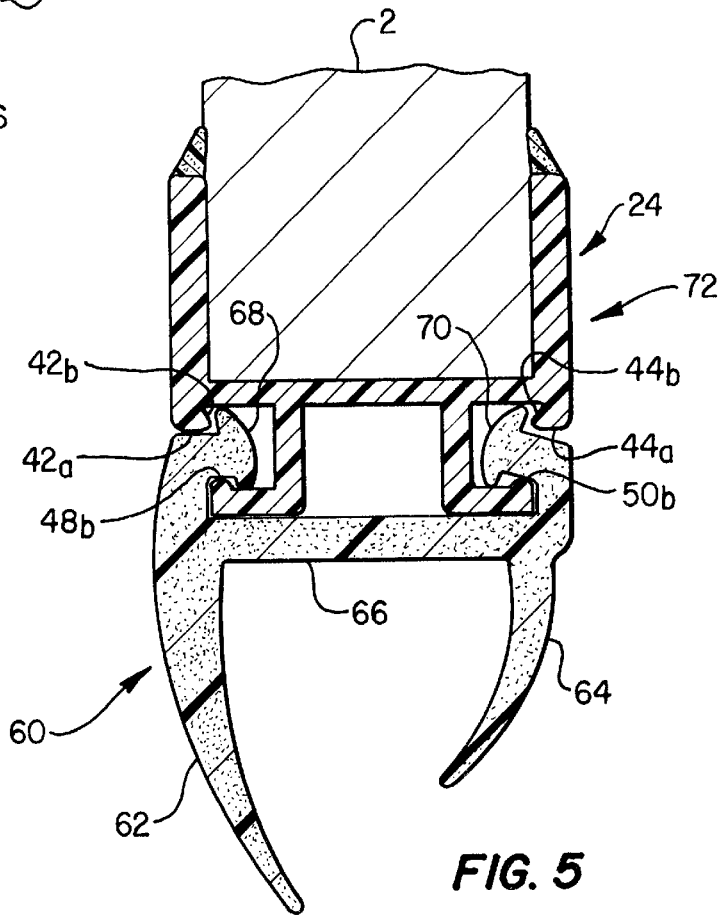
FIG. 5

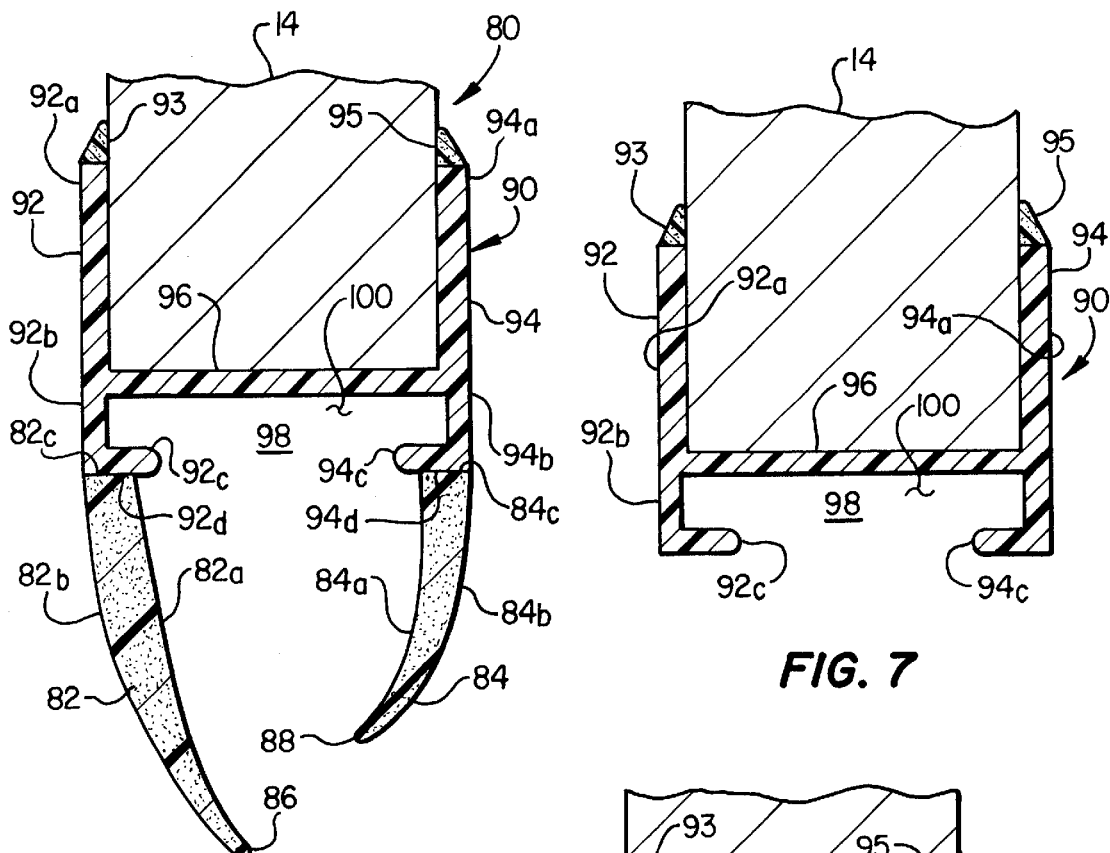
FIG. 6
FIG. 7
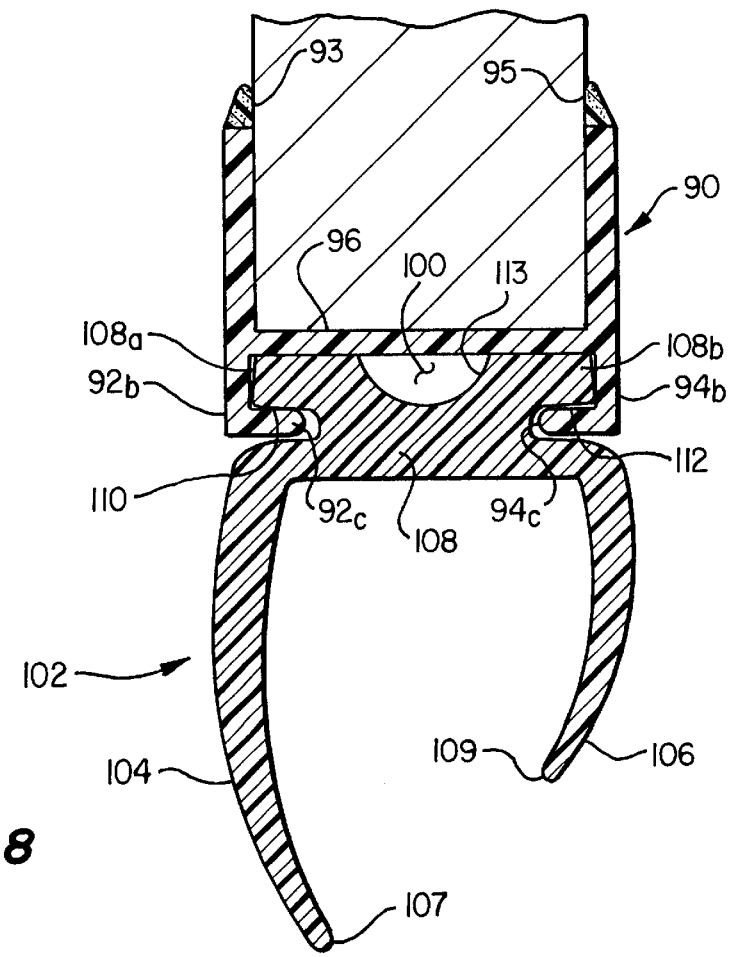
FIG. 8

REPLACEABLE DOOR SEAL AND RETAINER ASSEMBLIES

FIELD OF THE INVENTION

The present invention pertains to door edge seal and retainer assemblies wherein elongated seal lip members are integrally formed with a retainer attachable to the door edge and the lip members may be cut away, when worn, and replaced by another seal member without replacing the retainer.

BACKGROUND

In applications of swing doors, particularly in cargo container doors, it is desirable to obtain a weathertight seal, as well as a low pressure hermetic seal in certain applications, about the perimeter of the door panel or panels while at the same time providing minimal opening and closing forces required to be exerted on the doors. Moreover, in the manufacture of doors and seal assemblies therefor, it is desirable to provide seal assemblies which may be easily attached to the door panel edges while requiring minimal attachment effort and while also providing a seal which has a long life.

Door edge seals for cargo container doors, in particular, are subject to rapid wear due to the extreme environmental conditions they are subjected to as well as the frequent opening and closing motions of the doors. In this regard, the flexible seal lips are likely to suffer early wear and degradation or be subject to damage due to inadvertent engagement with truck or cargo container loading and unloading equipment, for example. Whereas it is difficult to replace the entire seal and retainer assembly which extends along the edges of the door, it is desirable to be able to replace any worn or damaged flexible seal lip parts without the effort required to replace the seal retainer or support structure or the entire door panel itself. It is to these ends that the present invention has been developed.

SUMMARY OF THE INVENTION

The present invention provides improved door edge seal and retainer assemblies, particularly adapted for use with swing doors for motor truck cargo containers and the like.

In accordance with one aspect of the invention, a door panel edge seal and retainer assembly is provided wherein a retainer member is adapted for engagement with and retention on the door panel edge and one or more elongated seal lips are integrally joined to the retainer and are preferably coextruded with the retainer from a polymer material. The retainer is configured such that the seal lips may be cut away when worn or damaged and replaced by a replacement seal member having, essentially, the same configuration and arrangement of seal lips or fingers and which may be supported on the retainer to form a replacement seal and retainer assembly. The hardness or rigidity of the seal member or members and the retainer member are different so that the seal members retain resiliency and are elastically deformable to provide an effective seal while the retainer member is provided with sufficient rigidity to allow for securing the retainer to a door panel edge.

In accordance with another aspect of the invention, a door edge seal and retainer assembly is provided with an integral seal part and wherein the retainer is configured to be connectable to a seal member which is fabricated separate from the retainer, may be easily assembled to the retainer and tightly secured thereto under all operating conditions and may be removed from the retainer for replacement, if needed.

The present invention still further provides an improved integral seal and retainer assembly wherein one or more flexible seal members and a retainer member may be coextruded of a suitable polymer material, such as polyvinylchloride, and the seal and retainer members may have different hardness or stiffness.

Still further, the present invention contemplates a method of repairing or replacing a flexible seal for a door panel edge wherein original integrally formed seal lip parts are removed from a retainer or support member without removing the retainer or support member from the door panel, and a replacement seal member is mountable on and retained on the retainer member. The replacement seal member is adapted to be easily mounted on and supported by the retainer member and multiple replacement seal members may be subsequently substituted for previous seal members without replacing the retainer member.

Those skilled in the art will further appreciate the above mentioned advantages and features of the invention together with other superior aspects thereof upon reading the detailed description which follows in conjunction with the drawings.

BRIEF DESCRIPTION OF THE DRAWINGS

FIG. 3 is a detail transverse section view of one of the seal and retainer assemblies shown in FIG. 2 but on a larger scale;

FIG. 4 is a section view of the retainer only after the opposed flexible seal lip parts have been cut away;

FIG. 5 is a section view of the retainer and a replacement seal member secured to the retainer;

FIG. 6 is a section view similar to FIG. 3 showing an alternate embodiment of an integral seal and retainer assembly in accordance with the invention;

FIG. 7 is a section view showing the retainer member of the embodiment of FIG. 6 with the opposed flexible seal lips cut away;

FIG. 8 is a section view similar to FIG. 5 showing a replacement seal member mounted on the retainer member of FIGS. 6 and 7.

DETAILED DESCRIPTION OF PREFERRED EMBODIMENTS

Figure 1:
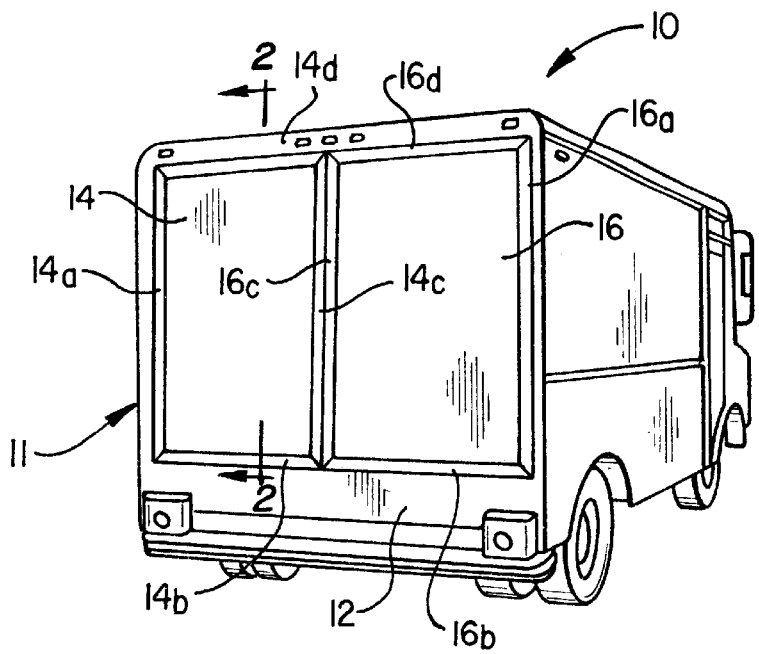
FIG. 1 is a perspective view of a motor truck having a cargo compartment or body with swing doors which include door edge seal and retainer assemblies in accordance with the present invention.

In the description which follows, like parts are marked throughout the specification and drawings with the same reference numerals, respectively. The drawing figures are not necessarily to scale and certain features or elements may be shown in somewhat schematic or generalized form in the interest of clarity and conciseness.

Referring to FIG. 1, there is illustrated a motor truck 10 having a generally rectangular boxlike cargo compartment or container 11 formed with a transverse rear wall 12 supporting opposed, generally rectangular and planar, swing door panels 14 and 16 for closing a rear opening in the cargo container. Panel side edge seals 14a, 14b, 14c and 14d extend along the perimeter edges of the panel 14 while corresponding side edge seals 16a, 16b, 16c and 16d extend along the perimeter edges of the door panel 16.

Figure 2:
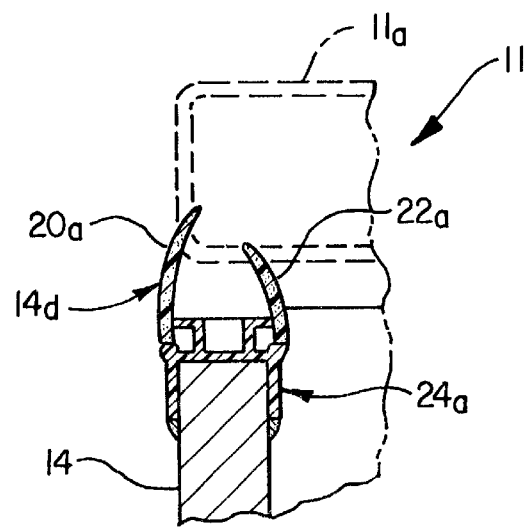
FIG. 2 is a section view taken along the line 2—2 of FIG. 1 showing one preferred embodiment of an integrally formed door edge seal and retainer assembly in accordance with the invention.
Figure 2:
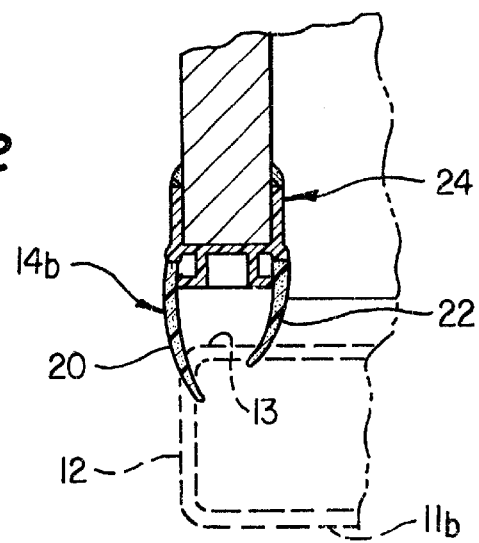

FIG. 2 illustrates a typical arrangement of door panel side edge seals for the panel 14. The panel 14 is, typically, a generally rectangular planar member having a relatively small thickness and may be fabricated of laminated wood, composite materials or metals, for example. By way of example, as shown in FIG. 2, cooperating panel edge seal and retainer assemblies 14b and 14d are shown, in the door closed position, engaged with container top wall or header 11a and container bottom wall or sill 11b for closing an opening 13 formed between these members in rear wall 12. The cross sectional configurations of the elongated integral seal and retainer assemblies 14b and 14d, as shown, are exemplary and each of the elongated combination seal and retainer assemblies associated with the cargo container 11 is essentially like the other seal and retainer assemblies, namely, those designated by the numerals 14a, 14c, 16a, 16b, 16c and 16d.

Referring primarily to FIGS. 2 and 3, by way of example, the seal and retainer assemblies 14b and 14d are shown engaged with the body or container 11 in the closed position of the door panel 14 and each of the seal and retainer assemblies includes a pair of elongated flexible seal lip parts indicated by numerals 20 and 22 for the assembly 14b and corresponding seal lip parts 20a and 22a as indicated for the assembly 14d. The seal and retainer assemblies 14b and 14d also include elongated channel shaped retainer parts 24 and 24a, as indicated in FIG. 2. The illustration of FIG. 2 indicates that the seal lip parts 20, 22, 20a and 22a are undeflected and shows these parts in their relaxed state. However, upon closure of the door panel 14, the flexible seal lip parts 20, 22, 20a and 22a would deflect upon engaging the container bottom and top walls 11b and 11a, respectively, to form a substantially weather tight seal at the cooperating surfaces of these walls, respectively.

Referring now primarily to FIG. 3, the seal and retainer assembly 14b is shown by way of example. Elongated flexible seal lip part 20 is formed as a somewhat arcuate tapered member having a distal tip 26 and a somewhat concave inner surface 28 spaced from a convex outer surface 30. Seal lip part 20 is tapered from an end 38, which is integrally joined to the retainer part 24, to the tip 26. Seal lip part 22 is arcuately curved toward seal lip part 20 and includes a distal tip 32 and arcuate concave and convex inner and outer surfaces 34 and 36 which taper, substantially, from an end 40, which is integrally joined to the retainer part 24, to the tip 32.

Seal retainer part 24 is a substantially channel shaped member having opposed elongated, generally parallel extending flanges 42 and 44 which are joined by a transverse web 46 to form a channel space 47 for receiving the bottom edge 14e of panel 14. Retainer part 24 is secured to the panel edge 14e by conventional means including a suitable adhesive and/or mechanical fasteners, not shown. Retainer part 24, as previously mentioned, is integrally joined to the seal lip parts 20 and 22 at the ends 38 and 40 and the seal lip parts and retainer part are preferably coextruded of a suitable polymer material, such as polyvinylchloride (PVC). The hardness or stiffness of the flexible seal lip parts 20 and 22 is preferably about 65 Duro A Heavy Duty and the hardness or stiffness of the channel retainer part 24 is preferably about 78 Duro D Heavy Duty. The polyvinylchloride composition should also have a service temperature range of about −35° F. to +164° F.

Referring further to FIG. 3, the retainer part 24 is also provided with a support for a replacement seal member, including opposed, integral, oppositely facing angle shaped legs 48 and 50 which, together with the web 46 and cooperative portions of the flanges 42 and 44, form elongated, generally rectangular cross section and parallel slots 52 and 54, see FIG. 4 also. The slots 52 and 54 have a narrowed mouth 52a and 54a, respectively, FIG. 4. Slot mouth 52a is delimited by an edge 48a of leg 48, a projection 48b thereon and an edge 42a of flange 42. Slot mouth 54a is delimited by an edge 50a of leg 50, a projection 50b on leg 50 and an edge 44a of flange 44. As shown in FIG. 3, the inner surfaces 28 and 34 of the seal lip parts 20 and 22 are engageable with the edges 48a and 50a, respectively, to close the mouths 52a and 54a of slots 52 and 54 during normal use of the seal and retainer assembly 14b. However, the seal lip parts 20 and 22 are not necessarily joined to the legs 48 and 50 at the edges 48a and 50a, although such may be the case. As previously discussed, the seal lip parts 20 and 22 are integrally joined to the flanges 42 and 44 at the lip part ends 38 and 40, respectively, which are coplanar with the flange edges 42a and 44a, respectively.

Referring further to FIGS. 2 and 3, the retainer part 24 is preferably provided with elongated integrally formed flexible tips 43 and 45 which are formed on and coextensive with the flanges 42 and 44 and are tapered toward each other to form seal members for engagement with opposed surfaces 14f and 14g of the door panel 14. The flexible seal tips 43 and 45 are also coextruded with the remainder of the seal and retainer assembly 14b and are preferably of the lower hardness or durometer specification of the seal lip parts 20 and 22 set forth herein.

The seal lip parts 20 and 22 are subject to wear and/or damage through repeated use. In accordance with the present invention, the seal lip parts 20 and 22 may be removed from the retainer part 24 at the juncture formed by the edges 42a and 44a and the ends 38 and 40, respectively, of the seal lip parts 20 and 22. Removal of the seal lip parts 20 and 22 from the retainer 24 may be accomplished by merely cutting these parts away from the retainer at the edges 42a and 44a of the retainer part to leave the retainer part in the configuration shown in FIG. 4 and still attached to the door panel 14.

Accordingly, the retainer part 24 may be used to support a replacement seal member, as shown in FIG. 5 and generally designated by the numeral 60. The seal member 60 includes opposed arcuately shaped elongated seal lip parts 62 and 64 corresponding substantially to the configuration of the seal lip parts 20 and 22 in most respects. However, the seal member 60 includes an integral elongated transverse web 66 which joins the seal lip parts 62 and 64 to each other. Still further, the seal member 60 includes opposed inwardly projecting retainer flanges 68 and 70 which are configured to be forcibly inserted through the mouths 52a and 54a of the slots 52 and 54 and into the slots in engagement with the legs 48 and 50 and the edges 42a and 44a of the retainer part flanges 42 and 44 to be retained therein and supported on the retainer part 24.

The seal member 60 takes the place of the individual seal lip parts 20 and 22 whereby the door panel 14 may be reconditioned to include suitable working seal and retainer assemblies corresponding to the seal and retainer assembly shown in FIG. 5 and generally designated by the numeral 72. Thanks to reentrant surfaces 42b and 44b, FIG. 5, of the flange edges 42a and 44a and the reentrant surfaces or projections 48b and 50b of the edges 48a and 50a of the respective legs 48 and 50, the opposed flanges 68 and 70, which are integrally formed on the seal member 60, are suitably retained in engagement with the retainer part 24 but may be forcibly removed from the retainer part if damage occurs to the seal member 60. Accordingly, the seal member 60 may be replaced by a like member and the panel 14 may have an extended life since the retainer part 24 will not require replacement unless it is damaged or worn itself.

The aforedescribed conversion of the seal and retainer assembly 14b to the seal and retainer assembly 72 may be carried out for each of the seal and retainer assemblies previously described in conjunction with FIGS. 1 and 2 of the drawings. A particular advantage of the integral seal and retainer assembly 14b is that the replaceable seal lip parts 20 and 22 are disposed over the mouths of the slots 52 and 54 to prevent intrusion of debris and moisture into the slots during normal operation of a door panel incorporating the seal and retainer assembly until the seal lip parts are cut away and replaced by the seal member 60. In this regard, the slots 52 and 54 do not require any clean out operation before insertion of the flexible resilient flanges 68 and 70 into the respective slots 52 and 54. The seal member 60 may be formed of polyvinylchloride (PVC) having substantially the same hardness as the seal lip parts 20 and 22.

Referring now to FIGS. 6 and 7, an alternate embodiment of a seal and retainer assembly in accordance with the invention is illustrated and generally designated by the numeral 80. The seal and retainer assembly 80 may be substituted for the seal and retainer assembly 14b on the panel 14, as illustrated, or similar panels and similar seal and retainer assemblies may be mounted on the panel extending along the top edge and opposed side edges thereof. The seal and retainer assembly 80 includes opposed, flexible, elongated seal lip parts 82 and 84 which have a configuration very similar to the seal lip parts 20 and 22, that is, being inwardly curved toward each other and tapered to respective distal tips 86 and 88. Thus, the seal lip parts 82 and 84 have arcuate inner concave surfaces 82a and 84a and arcuate outer convex surfaces 82b and 84b, respectively. Seal lip parts 82 and 84 are integrally joined to a retainer part 90 comprising a channel shaped member having opposed parallel and substantially coextensive flanges 92 and 94 which are joined by a transverse web 96.

Flanges 92 and 94 include opposed wing portions 92a and 92b and 94a and 94b, as shown in FIGS. 6 and 7. Replacement seal member support is provided by flange wing portions 92b and 94b which include reentrant coextensive and substantially coplanar edge portions 92c and 94c which delimit a mouth 98 for a slot 100 extending between the flange wing portions 92b and 94b and also delimited by the web 96. As shown in FIG. 6, the flexible lip parts 82 and 84 are integrally joined to the retainer part 90 at the flange wing edge portions 92c and 94c whereby the lip parts 82 and 84 have ends 82c and 84c which are substantially coplanar and which are integral with surfaces 92d and 94d of the flange wing edge portions 92c and 94c.

FIG. 7 illustrates the retainer part 90 with the seal lip parts 82 and 84 removed therefrom generally in the same manner that the seal lip parts 20 and 22 are removed from the retainer part 24, that is, by cutting or otherwise separating the seal lip parts from the retainer at the coincident surfaces forming joints between the seal lip parts 82 and 84, respectively, and the retainer part 90. Accordingly, when one or both of the seal lip parts 82 and 84 become worn or damaged, they both may be cut away from the retainer part 90 to leave the retainer part in the configuration shown in FIG. 7. Retainer part 90 also advantageously includes coextensive flexible seal tip portions 93 and 95 which extend from the distal edges of the flange wings 92a and 94a, as illustrated.

The seal lip parts 82 and 84 and the retainer part 90, together with the integral seal tip portions 93 and 95, may be integrally formed as an extrusion wherein the extruded material preferably comprises PVC and the hardnesses of the respective parts are substantially the same as for the embodiment of FIGS. 1 through 5. In other words, the seal lip parts 82 and 84 and the seal tip portions 93 and 95 are formed of PVC of hardness of about 65 Duro A Heavy Duty while the retainer part is extruded of PVC having a hardness or "durometer" of about 78 Duro D Heavy Duty.

Referring now to FIG. 8, the retainer part 90 is illustrated with a replacement seal member 102 suitably secured thereto. The seal member 102 includes opposed seal lip parts 104 and 106 having substantially the same geometry as the seal lip parts 82 and 84, that is, being somewhat arcuate and tapered in the direction of respective tip portions 107 and 109. The seal lip parts 104 and 106 are formed integral with a transverse web base part 108 having opposed, coextensive and substantially coplanar grooves 110 and 112 formed therein and opening to the exterior of the seal member 102 in opposite directions. The web base part 108, including the opposed grooves 110 and 112, defines opposed flange portions 108a and 108b which retain the seal member 102 firmly attached to the retainer part 90. The seal member 102 is of sufficient flexibility that the flanges 108a and 108b may be deflected to enable insertion through the mouth 98 into the slot 100. An elongated channel 113 in base 108 facilitates deflection of the flanges 108a and 108b during the aforementioned insertion procedure. Alternatively, the seal member 102 may be mounted on the retainer part 90 by sliding the base part 108 into the slot 100 from one end or the other of the retainer part 90.

Accordingly, inexpensive replaceable seal and retainer assemblies are provided by the present invention which include coextruded integral retainer parts and seal lip parts which may be initially mounted on the structure intended to be sealed by the assemblies and wherein the configuration of the retainer part and the arrangement of the seal lip parts connected to the retainer part are such that the seal lip parts may be removed, such as by cutting them away from the retainer part, and a replacement seal member mounted on the retainer part at seal member supports, such as the structure defining the slots formed in the respective retainer parts of the embodiments disclosed herein.

The fabrication and installation of the seal and retainer assemblies of the present invention is believed to be within the purview of one of ordinary skill in the art of flexible door edge seal and retainer assemblies.

Although preferred embodiments of a replaceable seal and retainer assembly have been described in detail herein, those skilled in the art will recognize that various substitutions and modifications may be made to the embodiments described without departing from the scope and spirit of the appended claims.

What is claimed is:

1. A method for replacing elongated flexible seal lip parts of an elongated door edge seal and retainer assembly, particularly adapted for providing a seal between the substantially linear edge of a cargo container door panel and a container body, said seal and retainer assembly comprising an elongated retainer part adapted to be secured to an edge of a door panel and extending therealong, said retainer part including a portion defining a support for engagement with a replacement seal member for supporting said replacement seal member thereon and two opposed elongated flexible seal lip parts integrally formed with said retainer part and coextensive with said retainer part along respective surfaces of said retainer part, said seal lip parts each being mounted on said respective surfaces of said retainer part adjacent said portion defining said support and comprising at least one elongated slot for receiving said replacement seal member, and said retainer part and said seal lip parts being coextruded of a polymer material wherein said retainer part and said seal lip parts have different hardnesses, said method comprising the steps of:

separating said seal lip parts from said retainer part at said respective surfaces of said retainer part; and mounting said replacement seal member on said retainer part by inserting a portion of said replacement seal member in said at least one slot.

2. The method set forth in claim 1 wherein:

the step of separating said retainer part from said seal lip parts comprises cutting both of said seal lip parts away from said retainer part at said surfaces of said retainer part, respectively.

3. An elongated door edge seal and retainer assembly, particularly adapted for providing a seal between a substantially linear edge of a cargo container door panel and a container body, said seal and retainer assembly comprising:

an elongated retainer part adapted to be secured to an edge of a door panel and extending therealong, said retainer part including a support comprising opposed generally parallel slots formed on said retainer part for engagement with a replacement seal member for supporting said replacement seal member thereon; and two opposed elongated flexible seal lip parts integrally formed with said retainer part and coextensive with said retainer part along respective surfaces of said retainer part, said seal lip parts including surfaces adjacent said slots, respectively, and said seal lip parts being removable from said retainer part to provide for substituting said replacement seal member to be supported on said retainer part in place of said seal lip parts.

4. An elongated door edge seal and retainer assembly, particularly adapted for providing a seal between a substantially linear edge of a cargo container door panel and a container body, said seal and retainer assembly comprising:

an elongated retainer part adapted to be secured to an edge of a door panel and extending therealong, said retainer part including a support for engagement with a replacement seal member for supporting said replacement seal member thereon and said retainer part defines opposed mouths opening to opposed elongated slots for receiving said replacement seal member, respectively; and two opposed elongated flexible seal lip parts integrally formed with said retainer part and coextensive with said retainer part along a surface of said retainer part, said seal lip parts being removable from said retainer part to provide for substituting said replacement seal member to be supported on said retainer part in place of said seal lip parts, said seal lip parts are mounted on surfaces of said retainer part adjacent said slots, said seal lip parts closing over said mouths of said slots, respectively, and said retainer part and said seal lip parts are coextruded of a polymer material wherein said retainer part and said seal lip parts have different hardnesses.

5. An elongated door edge seal and retainer assembly particularly adapted for providing a seal between a substantially linear edge of a cargo container door panel and a container body, said seal and retainer assembly comprising:

an elongated retainer part adapted to be secured to an edge of a door panel and extending therealong, said retainer part including a portion defining a support including two opposed elongated slots for receiving part of a replacement seal member for supporting said replacement seal member on said retainer part; and opposed elongated flexible seal lip parts integrally formed with said retainer part and coextensive with said retainer part along respective surfaces of said retainer part, said seal lip parts being disposed to substantially cover opposed openings in said slots, respectively, said seal lip parts being removable from said retainer part to provide access to said slots and said replacement seal member includes opposed flanges for engagement with said slots through said openings for substituting said replacement seal member to be supported on said retainer part in place of said seal lip parts.

6. The assembly set forth in claim 5 wherein:

said retainer part includes opposed, generally parallel flanges and an interconnecting web forming a channel for receiving an edge of said panel.

7. The assembly set forth in claim 6 wherein:

said seal lip parts are connected to said retainer part at respective ones of said flanges.

8. The assembly set forth in claim 5 wherein:

said retainer part and said seal lip parts are coextruded of a polymer material.

9. The assembly set forth in claim 8 wherein:

said retainer part has a hardness greater than said seal lip parts.

10. The assembly set forth in claim 5 including:

opposed flexible seal tip portions engageable with opposed surfaces of said panel to form a weather seal between said retainer part and said panel.

11. An elongated door edge seal and retainer assembly particularly adapted for providing a seal between the substantially linear edge of a cargo container door panel and a container body, said seal and retainer assembly comprising:

an elongated retainer part adapted to be secured to an edge of a door panel and extending therealong, said retainer part including a portion defining an elongated slot delimited by opposed flange edge portions extending toward each other but leaving an opening to said slot, said slot being adapted to receive a replacement seal member for supporting said replacement seal member on said retainer part; and two opposed elongated flexible seal lip parts integrally formed with said retainer part and coextensive with said retainer part along respective surfaces of said flange edge portions, respectively, said seal lip parts being removable from said flange edge portions of said retainer part to provide access to said slot by a replacement seal member for substituting said replacement seal member to be supported on said retainer part in place of said seal lip parts, said seal lip parts and said retainer part are coextruded of a polymer material and said retainer part and said seal lip parts have different hardnesses.

* * * * *